(12) United States Patent
Patti

(10) Patent No.: US 6,304,682 B1
(45) Date of Patent: Oct. 16, 2001

(54) METHOD FOR GENERATED RESOLUTION ENHANCED STILL IMAGES FROM COMPRESSED VIDEO DATA

(75) Inventor: Andrew J. Patti, Sunnyvale, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/166,015

(22) Filed: Oct. 2, 1998

(51) Int. Cl.$^7$ ............................. G06K 9/32; G06K 9/40; G06K 9/64
(52) U.S. Cl. ..................... 382/299; 382/254; 382/279
(58) Field of Search ....................... 382/284, 299, 382/254, 293, 298, 276, 280, 300, 279; 348/441, 452

(56) References Cited

U.S. PATENT DOCUMENTS

| | | | | |
|---|---|---|---|---|
| 5,561,611 | * | 10/1996 | Avinash | 382/279 |
| 5,579,054 | * | 11/1996 | Sezan et al. | 348/452 |
| 5,696,848 | * | 12/1997 | Patti et al. | 382/254 |
| 5,949,914 | * | 9/1999 | Yuen | 382/254 |
| 6,023,535 | * | 2/2000 | Aoki | 392/299 |

OTHER PUBLICATIONS

Andrew Patti, et al., Superresolution Video Reconstruction with Arbitrary Sampling Lattices and Nonzero Aperture Time, IEEE Transactions on Image Processing, 6, pp. 1064–1075, 1997.

M. Ibrahim Sezan—"An overview of convex projections theory and its application to image recovery problems". (Ultramicroscopy 40 (1992) pp. 55–67).

\* cited by examiner

*Primary Examiner*—Wenpeng Chen

(57) ABSTRACT

A method for generating a high-resolution image from a plurality of low-resolution images generated from quantized coefficients in the spatial frequency domain and the uncertainties in the quantized coefficients. The method generates a set of linear inequalities relating the quantized coefficients, the uncertainties therein, and the pixel values for the high-resolution image. Each linear inequality relates one of the quantized coefficients to a linear sum of the high-resolution pixel values. A high-resolution image whose pixels satisfy this set of inequalities is then generated

3 Claims, 1 Drawing Sheet

METHOD FOR GENERATED RESOLUTION ENHANCED STILL IMAGES FROM COMPRESSED VIDEO DATA

FIELD OF THE INVENTION

The present invention relates to computer processing of image data, and more particularly, to a method for generating still images from compressed video data.

BACKGROUND OF THE INVENTION

The storage and data processing capabilities of personal computers have increased to the point that is now possible to provide video processing on such computers. Computer systems that can capture video from cameras, recorders, or television tuners are currently available. Video signals usually have very low quality. The video appears to be of better quality, because the errors from frame to frame are "averaged" by the viewer's eyes.

There is a growing interest in creating high quality still images from video sequences. Since each video frame has relatively poor resolution, the information in a number of frames is combined to generate a still image having a resolution that is much better than the individual frames. The prior art methods for combining the frames operate on uncompressed data in the "pixel" domain.

While storage costs have decreased considerably, the amount of data inherent in a video sequence is still too large to allow more than short video clips to be stored without some form of compression. Accordingly, many video capture systems output compressed video data. The compression algorithms reduce the high frequency information, which is needed to create high-quality still images, and hence, further complicate the still image construction problem. In addition, the compressed video contains quantization information that is not easily utilized in the pixel domain.

Broadly, it is the object of the present invention to provide an improved still image reconstruction system.

It is a further object of the present invention to provide a still image reconstruction system that operates on compressed video data.

It is a still further object of the present invention to provide a still image reconstruction system that takes into account the quantization information in the compressed video sequence.

These and other objects of the present invention will become apparent to those skilled in the art from the following detailed description of the invention and the accompanying drawings.

SUMMARY OF THE INVENTION

The present invention is a method for generating a high-resolution image from a plurality of low-resolution images generated from quantized coefficients in the spatial frequency domain and the uncertainties in the quantized coefficients. The method generates a set of linear inequalities relating the quantized coefficients, the uncertainties therein, and the pixel values for the high-resolution image. Each linear inequality relates one of the quantized coefficients to a linear sum of the high-resolution pixel values. A high-resolution image whose pixels satisfy this set of inequalities is then generated.

DETAILED DESCRIPTION OF THE INVENTION

Figure 1:
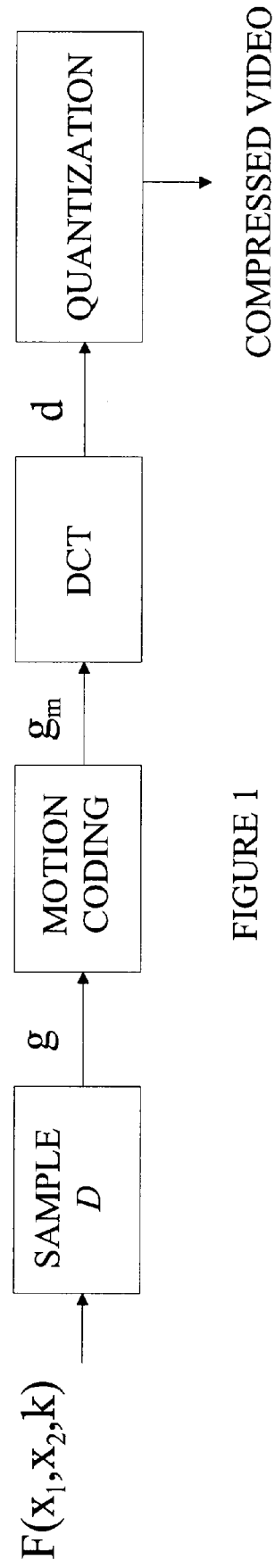
FIG. 1 is a block diagram of a typical MPEG motion picture compression algorithm utilizing motion compensation.

In the following discussion, it will be assumed that a continuous motion picture sequence $F(x_1,x_2,t)$ has been captured in the form of a video stream. The video stream consists of a sequence of discrete frames having pixels that are determined by a discrete sampling lattice, D. The individual frames of the video sequence will be denoted by $g(m_1,m_2,k)$, where $m_1$, $m_2$, and k are integers. This sequence is compressed by the MPEG compression algorithm to generate a compressed video stream, which will be discussed in detail below.

The goal of the present invention is to reconstruct a high-resolution version of a frame within this sequence. Denote the high-resolution frame by f. In general, this frame will correspond in time to one of the frames in the video sequence discussed above. The actual output of the present invention is a discretized frame $f(n_1, n_2)$ where $(n_1, n_2)$ are specified by a second sampling lattice which has a higher resolution than D.

To obtain the high-resolution frame, the data in a number of frames adjacent to f are combined. It is assumed that the scene from which f is to be extracted is changing slowly enough that the pixels of f are also present in the frames on each side of f; although the locations of the pixels may be different. For example, if the camera recording the scene pans and f is located in the middle of the pan sequence, the pixels in f will also be present in the frames on each side of f at locations displaced from the locations in f. It should be noted that not all of the pixels of f are available in all of the frames on each side.

The relationship of the pixels in the frames surrounding the frame corresponding to f may be represented by a continuous, linear, shift-variant blur function. The actual motion in the video will determine the location and possibly the form of the blur h. The blur function will be discussed in more detail below.

The manner in which the present invention achieves its advantages can be more easily understood with reference to FIG. 1, which illustrates the manner in which a video stream is processed to generate an MPEG compressed video stream utilizing motion compensation. In the figure, $F(x_1,x_2,t)$ denotes the original continuous motion picture scene. This scene is "captured" by the camera and sampled on a lattice, D, to generate a discrete sequence of frames $g(m_1,m_2,k)$, where $(m_1,m_2)$ are determined by the lattice and k denotes the frame number in the sequence of frames.

The camera output, g, is compressed in two steps. In the first step, each frame is approximated using a motion compensation algorithm, which attempts to represent the frame in terms of blocks from a reference frame. Each frame is divided into blocks. One of the frames in the sequence is defined to be a reference scene. Each block in the frame being compressed is compared to blocks of the same size in the reference frame to find the block that most closely approximates that block. The block in the reference frame is defined by providing a motion vector, which is the displacement of the block in the current frame relative to the block in the reference frame. The difference of the two blocks is then taken. If the block in the reference frame is a good approximation of the current block, the difference "image" will have much less intensity that the original block. If the match is poor, the difference image will be no more intense than the original block, hence, little is lost by such an approximation even when the match is poor.

The difference image is then transformed using a discrete cosine transform (DCT). In the MPEG standard, 8×8 pixel blocks from the motion compensated image are transformed by the DCT. The resulting 8×8 blocks of DCT coefficients, d, are quantized using a quantization algorithm, Q, in which each coefficient is converted to an integer by dividing the coefficient by a step size that depends on the coefficient's position in the 8×8 block. The quantization introduces errors into the reconstructed image, since two DCT coefficient values that differed by less than the step size are now set to the same value.

As noted above, the frames on each side of f in the sequence can be represented in terms of f and a blur function h. From the above discussion, the discretized output of the camera can be written as:

$$g(m_1,m_2,k) = \int h(x_1,x_2;m_1,m_2,k)f(x_1,x_2)dx_1,dx_2 + v(m_1,m_2,k) \qquad (1)$$

where v denotes additive noise, and the blur h, implicitly applies to some reference time for f. It should be noted that discrete indices $m_1$, $m_2$, and k are applied to the continuous spatio-temporal coordinates $x_1$ and $x_2$ through the sampling lattice D. Note that the true scene motion is taken into account via h. Since the actual data is all discrete, it is useful to convert Eq. (1) to a discrete form, consider the discretization method so that the continuous spatial coordinates $x_1$ and $x_2$ can be avoided.

Define an estimate, $\hat{f}$, by $$\hat{f}(x_1, x_2) = \left(f(x_1, x_2) \sum_{n_1,n_2} \delta(x_1 - n_1, x_2 - n_2)\right) * h_r(x_1, x_2), \qquad (2)$$

where $\hat{f}$ is an estimate of f after the Dirac-sampled version is reconstructed using $h_r$, and where the ordered pair $(n_1,n_2)$ specifies a location determined by the lattice used to specify locations in $(x_1,x_2)$. Note that this lattice is most likely rectangular, however, other lattices may be utilized. By using this representation, it can be shown that:

$$h_d(n_1, n_2; m_1, m_2, k) = \qquad (3)$$

$$[h(x_1, x_2; m_1, m_2, k) * h_r(x_1, x_2)]_{(x_1,x_2) \Rightarrow (n_1,n_2)},$$

$$g(m_1, m_2, k) = \sum_{n_1,n_2} f(n_1, n_2)h_d(n_1, n_2; m_1, m_2, k) + v(m_1, m_2, k),$$

where $h_d$ denotes the discretized blur function, and where the convolution occurs on $(x_1,x_2)$ and is evaluated on the high-resolution sampling lattice indexed by $(n_1,n_2)$.

As will be explained in more detail below, the present invention makes use of the quantization information contained in the MPEG representation of the video sequence. In particular, the present invention provides a relatively simple method for taking the quantization errors into account while determining the best high-resolution image that could have given rise to the MPEG encoded data.

The manner in which the MPEG data is utilized can be more easily understood from a more detailed description of the MPEG coding algorithm. As noted above, each block in the current frame is matched to a block in a reference frame, which is subtracted from the image frame. Denote the motion compensated prediction by $\hat{g}(m_1, m_2, k)$. Then:

$$g_m(m_1,m_2,k) = g(m_1,m_2,k) - \hat{g}(m_1,m_2,k) + v(m_1,m_2,k). \qquad (4)$$

The MPEG algorithm then takes the 8×8 block-based DCT of the motion compensated block to arrive at the DCT coefficients, $d(m_1,m_2,k)$ that are to be quantized. Taking the DCT transform of Eq. (4) yields:

$$d(m_1, m_2, k) = G(m_1, m_2, k) - \hat{G}(m_1, m_2, k) + V(m_1, m_2, k), \qquad (5)$$

$$G(m_1, m_2, k) = \sum_{n_1,n_2} f(n_1, n_2) \left\{ \sum_{l_1=L(m_1)}^{L(m_1)+7} \sum_{l_2=L(m_2)}^{L(m_2)+7} C_{8\times 8}(m_1 \% 8, m_2 \% 8; l_1, l_2) \right.$$

where G, $\hat{G}$, and V denote the 8×8 DCT of g, $g_m$ and v, respectively, $C_{8\times 8}$ is the 8×8 DCT coefficient generating function, and where the limit function is defined by:

$$L(m) = (m \operatorname{div} 8)*8. \qquad (6)$$

If one defines the blur operator by $$h_{DCT}(n_1, n_2; m_1, m_2, k) = \qquad (7)$$

$$\sum_{l_1=L(m_1)}^{L(m_1)+7} \sum_{l_2=L(m_2)}^{L(m_2)+7} C_{8\times 8}(m_1 \% 8, m_2 \% 8; l_1, l_2)h_d(n_1, n_2; l_1, l_2, k),$$

Then $$d(m_1, m_2, k) = \qquad (8)$$

$$\sum_{(n_1,n_2)} f(n_1, n_2)h_{DCT}(n_1, n_2; m_1, m_2, k) + DCT\{\hat{g}\} + DCT\{v\}.$$

Here, "m %8" denotes m modulo 8.

It should be noted that the MPEG data consists of the quantized versions of $d(m_1,m_2,k)$, $d_q(m_1,m_2,k)$. As noted above, these values may be in error by as much as one quantization step. That is, $$d_q(m_1,m_2,k) - S(m_1,m_2,k)/2 \leq d(m_1,m_2,k) \leq d_q(m_1,m_2,k) + S(m_1,m_2,k)/2 \qquad (9)$$

where $S(m_1,m_2,k)$ is the step size used in quantizing $d(m_1,m_2,k)$. Hence, given $h_d$, Eq.(9) defines a set of inequalities that can be used to compute $f(n_1,n_2)$. The present invention is based on the observation that this set of inequalities is particularly simple in the DCT domain.

In prior art methods for generating high-resolution images from a plurality of low-resolution images, a set of equations that are analogous to Eqs. (8)–(9) are constructed and an attempt made at a solution thereof in the pixel domain. In the pixel domain, the equivalent analysis leads to a maximum likelihood fit that depends on a non-Guassian probability distribution. The present invention avoids this complexity by operating in the DCT domain.

The function, $h_d$, is only valid where the motion can be accurately estimated. Additionally, motion boundaries where occlusion and uncovered background exist are particularly difficult to model. As a result, Eq. (8) will not be valid for every observation location $(m_1,m_2,k)$. In the preferred embodiment of the present invention, the set of inequalities is only generated for the points in the reference frame at which the motion modeling is known to be valid. The manner in which $h_d$ is computed from a motion sequence is known to those skilled in the art, and hence, will not be discussed in detail. The reader is directed to Andrew Patti, et al., "Superresolution Video Reconstruction with Arbitrary Sampling Lattices and Nonzero Aperture Time", IEEE TRANSACTIONS ON IMAGE PROCESSING, 6, pp. 1064–1075, 1997 for a more detailed discussion. This article is reproduced in Appendix A.

In the preferred embodiment of the present invention, the motion of a pixel from one frame to another is computed using an optical flow model. In such a model the position of a the pixel located at $(x_1,y_1)$ in frame 1 is determined in frame 2 by assuming that the intensity of the pixel in frame 2 is the same as that in frame 1 and by assuming some model for the motion of the pixel, i.e., $$x_2 = x_1 + u(x_1, y_1)$$

and $$y_2 = y_1 + v(x_1, y_1) \qquad (10)$$

where $u(x,y)$ and $v(x,y)$ are the x and y motion vectors. The motion estimation operates by assuming a model for u and v and then testing how well that model actually performs in estimating the motion of the pixel in question. If the model accurately predicts the motion, then an inequality for the point in question is included in the set of inequalities discussed above.

In the preferred embodiment of the present invention, it is assumed that a block of pixels around the pixel of interest moves in the same manner as the pixel in question. Under this assumption, the displacement of the pixel in frame 2 is determined by defining a block of pixels around the pixel of interest at $(x_1,y_1)$ in frame 1 and then searching for a block of the same size in frame 2 that matches this block. If the model is valid, the measured differences between the two blocks should be less than some predetermined value. If this condition is met, than a value for (u,v) between the first and second frames for the pixel in question can be deduced. This procedure may be repeated for each frame to determine the motion of a particular pixel in the reference frame. This set of displacements defines the motion trajectory utilized in computing the blur function h discussed with reference to Eq. (1) above.

While the preferred embodiment of the present invention assumes that all of the pixels in a given block move with the same speed between frames, other models may be utilized. For example, $u(x,y)$ and $v(x,y)$ can be expanded as Taylor series in (x,y) and the parameters of the series determined by matching pixels in the successive frames to determine the best fit for the parameters. Other motion estimation models will also be apparent to those skilled in the art.

Any method for solving the set of inequalities defined by Eq. (8) to obtain an estimate of $f(n_1,n_2)$ may be used. The preferred method for solving the inequalities represented by Eqs. (8)–(9) is the method of projection on convex sets (POCS). Since this method is known to those skilled in the art, it will not be discussed in detail here. The reader is directed to Sezan, "an overview of convex projections theory and its applications to image recovery problems", Ultramicroscopy, no 40, pp. 55–67, 1992 for a more detailed discussion. The method is an iterative method that starts from an estimation of $f(n_1,n_2)$. This estimation is provided by interpolating the reference frame to provide values on the $f(n_1,n_2)$ grid. It should be noted that the set of inequalities may not include inequalities that define $f(n_1,n_2)$, if the motion estimation failed for pixels in the vicinity of $(n_1,n_2)$ in the reference frame. In this case, the value of $f(n_1,n_2)$ will not be updated by POCS algorithm. Hence, the quality of the image in the region in question will not improve. It is important to note, however, that the quality of the image in these regions will not be degraded either.

The above-described embodiments of the present invention have utilized optic flow based motion estimation. However, it will be obvious to those skilled in the art from the preceding discussion that any form of motion estimation may be utilized.

Various modifications to the present invention will become apparent to those skilled in the art from the foregoing description and accompanying drawings. Accordingly, the present invention is to be limited solely by the scope of the following claims.

What is claimed is:

1. In a method for generating a high-resolution image comprising a plurality of high-resolution pixel values from a plurality of low-resolution images, each low-resolution image being generated from coefficients in a spatial frequency domain, each of said coefficients in said spatial frequency domain having a known uncertainty associated therewith, the improvement comprising the steps of:

generating a plurality of linear inequalities relating said coefficients, the uncertainties therein, and pixel values for said high-resolution image; and determining a set of high-resolution pixel values satisfying said linear inequalities.

2. The method of claim 1 wherein said step of determining said set of high-resolution pixels comprises making an initial estimate of said high-resolution image by interpolating pixel values of one of said low-resolution images.

3. The method of claim 1 wherein said step of generating said set of linear inequalities comprises:

estimating the location of a pixel in one of said low-resolution images corresponding to said pixel in another of said low-resolution images assuming a plurality of pixels around said pixel move between said low-resolutions images according to a predetermined relationship; and determining the extent to which each of said pixels in said plurality of pixels around said pixel actually moved.

\* \* \* \* \*